(12) United States Patent
Kandagatla et al.

(10) Patent No.: US 9,528,562 B1
(45) Date of Patent: *Dec. 27, 2016

(54) INTERLOCK BRAKING SYSTEM

(71) Applicant: International Business Machines Corporation, Armonk, NY (US)

(72) Inventors: Sudarshan Kandagatla, Bangalore (IN); Alok S. Kataria, Bangalore (IN); Vishwas Manjunath, Mysore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,056

(22) Filed: Feb. 3, 2016

Related U.S. Application Data

(63) Continuation of application No. 14/960,508, filed on Dec. 7, 2015.

(51) Int. Cl.
| | | |
|---|---|---|
| *F16D 55/00* | (2006.01) | |
| *F16D 55/02* | (2006.01) | |
| *F16D 125/44* | (2012.01) | |
| *F16D 127/08* | (2012.01) | |

(Continued)

(52) U.S. Cl.
CPC .............. *F16D 55/02* (2013.01); *B60T 1/02* (2013.01); *B60T 1/10* (2013.01); *F16D 2125/44* (2013.01); *F16D 2127/08* (2013.01)

(58) Field of Classification Search
CPC F16D 2055/0058; F16D 55/02; F16D 55/025; F16D 55/22; F16D 55/36; F16D 55/46; F16D 67/02; F16D 2125/44; F16D 2125/46; F16D 2127/08; F16D 2127/12; B60T 1/02; B60T 1/04; B60T 1/06; B60T 1/062; B60T 1/065; B60T 1/10; B60T 1/00

See application file for complete search history.

(56) References Cited

U.S. PATENT DOCUMENTS

| | | | | |
|---|---|---|---|---|
| 2,018,458 | A | * 10/1935 | Martin | ...................... B60T 1/04 188/140 R |
| 3,680,669 | A | * 8/1972 | Hansen | ................... F16D 67/02 192/18 R |
| 3,771,745 | A | 11/1973 | Yamada | |

(Continued)

FOREIGN PATENT DOCUMENTS

| | | | | |
|---|---|---|---|---|
| CH | WO 2013023310 | A1 * | 2/2013 | .............. B62M 1/36 |
| DE | 3131552 | A1 * | 2/1983 | ................ B60T 1/04 |

(Continued)

OTHER PUBLICATIONS

Machine translation of DE 3131552 (no date).*

(Continued)

*Primary Examiner* — Nicholas J Lane
(74) *Attorney, Agent, or Firm* — Gilbert Harmon, Jr.

(57) ABSTRACT

In an approach to interlock braking, one or more driving wheels and one or more driven wheels are engaged to rotate in the same first direction. One or more braking wheels are driven by a power transmission mechanism associated with the one or more driving wheels. A first braking surface, associated with the one or more driven wheels, and a second braking surface, associated with the one or more braking wheels, engage. A braking force is generated by the engagement of the first braking surface and the second braking surface, and transmitted by the power transmission mechanism to the one or more driving wheels.

1 Claim, 4 Drawing Sheets

(51) Int. Cl.
B60T 1/02 (2006.01)
B60T 1/10 (2006.01)

(56) References Cited

U.S. PATENT DOCUMENTS

| | | | | |
|---|---|---|---|---|
| 4,305,599 A | * | 12/1981 | Houston | B62M 1/10 |
| | | | | 185/39 |
| 4,687,461 A | * | 8/1987 | Palloch | D05B 69/125 |
| | | | | 112/220 |
| 2003/0137123 A1 | * | 7/2003 | Serdiuk | B60T 1/062 |
| | | | | 280/261 |

FOREIGN PATENT DOCUMENTS

| WO | 2009151279 A2 | 12/2009 |
|---|---|---|
| WO | 2009151279 A3 | 4/2010 |

OTHER PUBLICATIONS

Machine translation of WO 2013023310 (no date).*
"Spin two wheels in opposite directions with single DC motor?", StackExchange, <http://electronics.stackexchange.com/questions/8639/spin-two-wheels-in-opposite-directions-with-single-dc-motor>, printed Aug. 5, 2015, pp. 1-3.
Kandagatla et al, "Interlock Braking System", U.S. Appl. No. 14/960,508, filed Dec. 7, 2015, 19 pages.
IBM Appendix P, list of patents and patent applications treated as related, May 26, 2016, 2 pages.

* cited by examiner

INTERLOCK BRAKING SYSTEM

BACKGROUND OF THE INVENTION

The present invention relates generally to the field of vehicle and/or manufacturing engineering, and more particularly to braking systems.

In cars, braking systems typically comprise front disk brakes and rear disk or drum brakes, with each brake connected to one master cylinder. Activating the braking system forces brake fluid through a series of tubes to an individual braking unit at each wheel. In the case of disk brakes, the force of the brake fluid against a piston at each brake causes the piston to squeeze two brake pads against the disk. The squeezing of the brake pads against the disk causes the wheel to slow or stop its rotation. In the case of drum brakes, the force of the brake fluid entering a wheel cylinder causes brake shoes to press against the drum, slowing or stopping the rotation of the attached wheel.

In bicycles, in the case of rim brakes, a rider activates the brake system by squeezing the bicycle handles, and a cable transfers the energy from the squeeze to a caliper that holds rubber brake pads near the wheel rim. The transferred energy causes the caliper to squeeze the brake pads against the wheel rim, slowing or stopping the rotation of the wheel. In the case of coaster brakes, a rider initiates braking by pressing backwards on the pedals. Pedaling backwards triggers a gear in the rear wheel gear system, called the hub, which locks to stop the rotation of the wheel.

SUMMARY

According to one embodiment, a method for interlock braking is provided. The method comprises: providing one or more driving wheels and one or more driven wheels, wherein the one or more driving wheels and the one or more driven wheels are engaged to rotate in a same first direction; providing one or more braking wheels, wherein the one or more braking wheels are driven by a crossed power transmission mechanism associated with the one or more driving wheels, wherein the one or more braking wheels comprise two braking wheels engaged to rotate in opposite directions, and wherein the one or more driven wheels and one of the two braking wheels are engaged to rotate independently and in opposite directions; closing a gap between one of the one or more driven wheels and the one of the two braking wheels to bring the driven wheel and the braking wheel into contact with each other; engaging a first braking surface, associated with the one of the one or more driven wheels, against a second braking surface, associated with the one of the two braking wheels; providing a high-friction material on the first braking surface; and generating a braking force between the one or more braking wheels and the one or more driven wheels, wherein slowing rotation of the one of the one or more driven wheels is achieved by interaction of the high-friction material with the second braking surface, and wherein the braking force is transmitted by the power transmission mechanism to the one or more driving wheels.

DETAILED DESCRIPTION

Embodiments disclosed herein can be implemented in braking systems to obviate the need for separate brakes on each wheel, where more than one wheel is initially rotating in the same direction. Embodiments of the present invention use the motion of a first wheel to slow rotation of a second wheel in order to effect braking. The embodiments disclosed herein can be implemented in, without limitation, cars, bicycles, and other machines, as an alternative to traditional braking mechanisms that is less prone to wear-and-tear.

Embodiments will now be described in detail with reference to the accompanying figures. It should be noted that the disclosed embodiments are illustrative and not intended to be restrictive. Further, the accompanying figures are not necessarily to scale. One skilled in the art should recognize that the various elements and features disclosed in the figures can have different dimensions than those depicted, and that the various structural and functional details disclosed herein should be interpreted not as limiting, but merely as exemplary.

References in the specification to "an exemplary embodiment," and "another embodiment," etc., indicate that the embodiment described may include a particular feature, structure, or characteristic, but every embodiment may not necessarily include the particular feature, structure, or characteristic. Further, when a particular feature, structure, or characteristic is described in connection with an embodiment, it is submitted that it is within the knowledge of one skilled in the art to affect such a feature, structure, or characteristic in connection with other embodiments, whether or not specifically described.

Figure 1A:
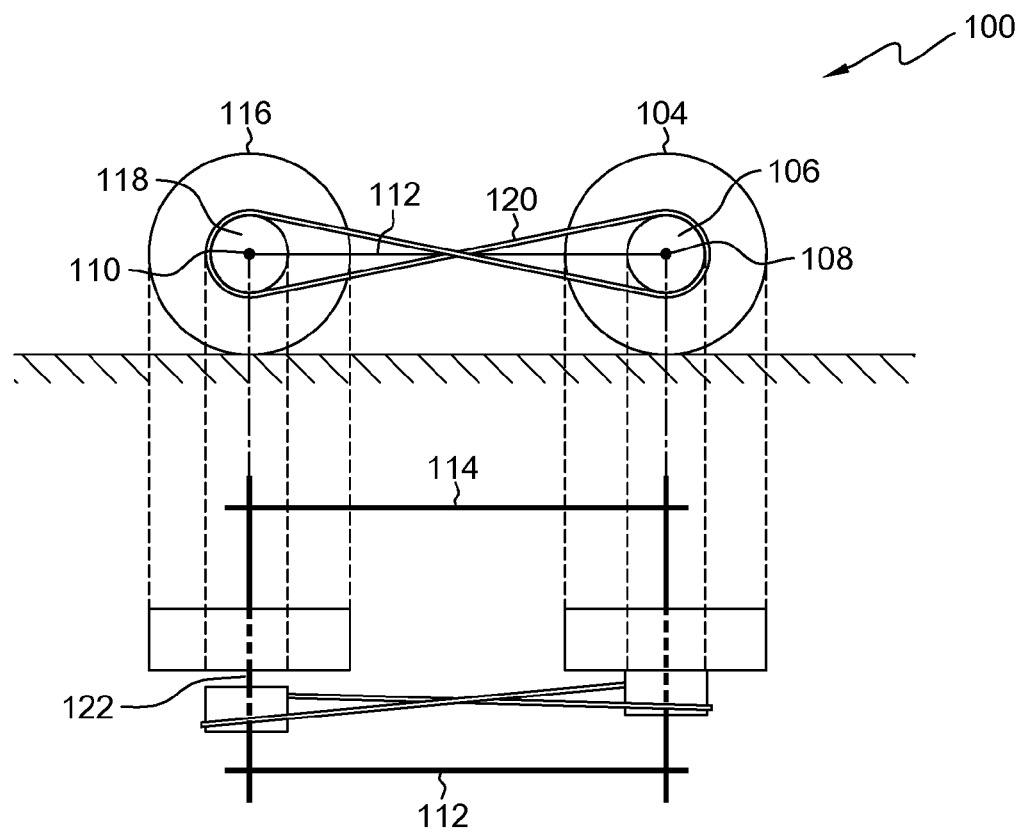
FIG. 1A-B shows a side view and its corresponding top view, and another top view, respectively, of an interlock braking apparatus, in accordance with exemplary embodiments of the present invention.

FIG. 1A shows a side view and its corresponding top view, generally referred to as diagram 100, of an interlock braking apparatus, in accordance with an exemplary embodiment of the present invention. Diagram 100 shows wheel 104, wheel 106, axle 108, axle 110, coupler 112, coupler 114, wheel 116, wheel 118, crossed belt mechanism 120, and initial gap 122.

Wheel 104 and wheel 116 can be, for example but without limitation, wheels on or in a car, a bicycle, or another type of machine or vehicle. Wheel 106 and wheel 118 are braking wheels paired with wheel 104 and wheel 116, respectively.

Wheel 104 and wheel 106 are rigidly mounted on axle 108. Axle 108 is a driving axle. Axle 108 is connected with axle 110 by coupler 112 and coupler 114. Axle 110 is a driven axle. Wheel 116 is rigidly mounted on axle 110. Wheel 118 is freely mounted on axle 110, for example on a bearing (not shown). Wheel 106 is connected with wheel 118 by crossed belt mechanism 120. Crossed belt mechanism 120 can be, for example but without limitation, a chain on a bicycle or a belt on or in other kinds of machinery.

Before braking has been initiated, wheel 104, wheel 106, and wheel 116 all rotate in the same direction. Due to the effect of crossed belt mechanism 120, wheel 118 rotates in the opposite direction of wheel 104, wheel 106, and wheel 116.

Initial gap 122 is a gap between wheel 116 and wheel 118. Initial gap 122 is filled when braking is initiated. For example, hydraulic pressure can be leveraged to push wheel 118 toward wheel 116. Wheel 118 approaches and exerts a force on wheel 116 that opposes the initial rotation of wheel 116. For example, because wheel 116 and wheel 118 are rotating in opposite directions, contact of wheel 118 with wheel 116 slows the rotation of wheel 116. The braking force is transferred through crossed belt mechanism 120 to wheel 106 and wheel 104. Accordingly, the rotation of wheel 106 and wheel 104 is also slowed.

Figure 1B:
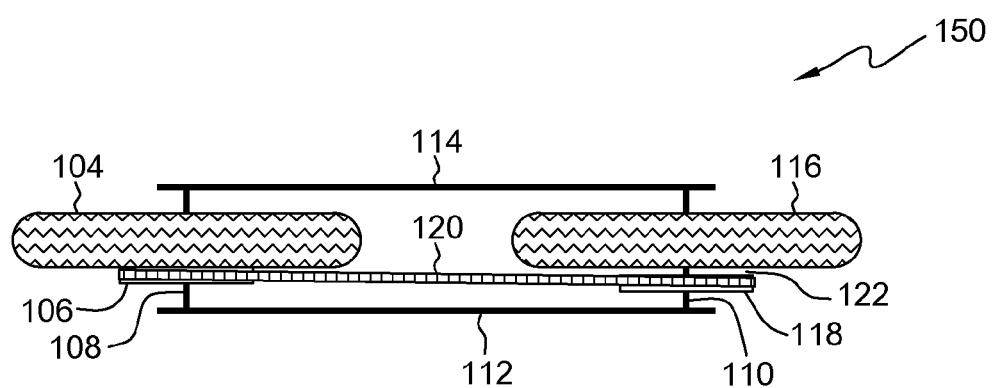

FIG. 1B shows another top view 150 of an interlock braking apparatus, in accordance with an exemplary embodiment of the present invention. For example, top view 150 can be an interlock braking apparatus implemented in a bicycle. Top view 150 shows wheel 104, wheel 106, axle 108, axle 110, coupler 112, coupler 114, wheel 116, wheel 118, crossed belt mechanism 120, and initial gap 122.

Wheel 104 is attached to wheel 106. For example, wheel 106 can be attached to a front derailleur (not shown). In this exemplary embodiment, wheel 118 can be a chain ring. Wheel 118 is free to rotate about its axis. Initial gap 122 between wheel 116 and wheel 118 allows wheel 116 and wheel 118 to rotate independently. When a rider initiates braking, for example by squeezing the brake handles of the bicycle (not shown), wheel 118 comes into contact with wheel 116 and exerts a force on wheel 116 that opposes the initial rotation of wheel 116. As described in the previous example with respect to FIG. 1A, the braking force applied to wheel 116 is also applied to wheel 118 and transferred by crossed belt mechanism 120 to wheel 106 and wheel 104, slowing the rotation of wheels 104, 106, 116, 118 simultaneously.

Figure 2A:
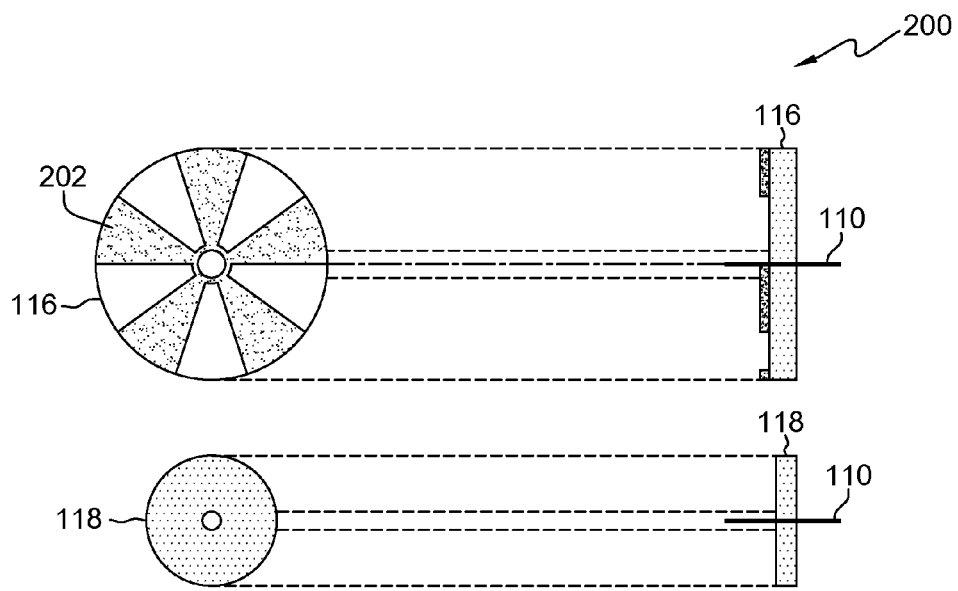
FIG. 2A-B shows corresponding front and side views of a separate driven wheel and braking wheel, and paired driven wheel and braking wheel, respectively, in accordance with an exemplary embodiment of the present invention.
Figure 2B:
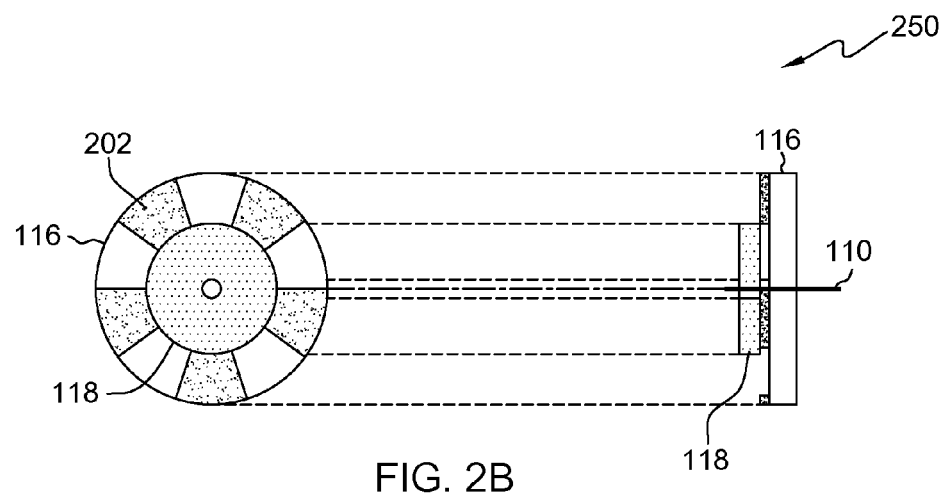

FIG. 2A-B shows corresponding front and side views of a separate driven wheel and braking wheel, generally numbered 200, and corresponding front and side views of a paired driven wheel and braking wheel, generally numbered 250, in accordance with an exemplary embodiment of the present invention. Front and side views 200 show wheel 116 mounted on axle 110, and wheel 118 mounted on axle 110. Wheel 116 includes brake material 202. Brake material 202 is a high-friction material and can be, for example but without limitation, cast iron or composite.

Front and side views 250 show paired wheel 116 and wheel 118 mounted together on axle 110, in contact as during braking. During braking, brake material 202 on the surface of wheel 116 comes into contact with the surface of wheel 118. Friction resulting from the contact of brake material 202 on wheel 116 with the surface of wheel 118 exerts a force on wheel 116 that slows the rotation of wheel 116, causing braking.

Figure 3A:
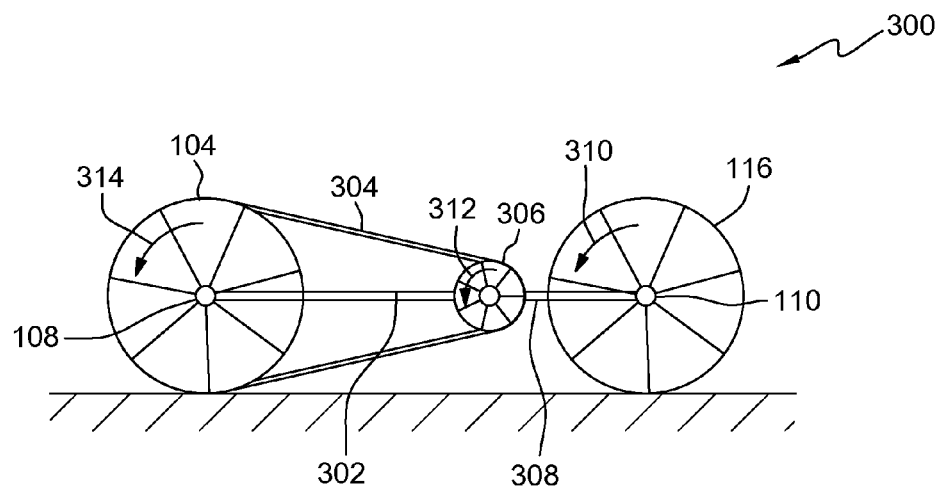
FIG. 3A-B shows side views of an interlock braking apparatus before braking and during braking, respectively, in accordance with an exemplary embodiment of the present invention.
Figure 3B:
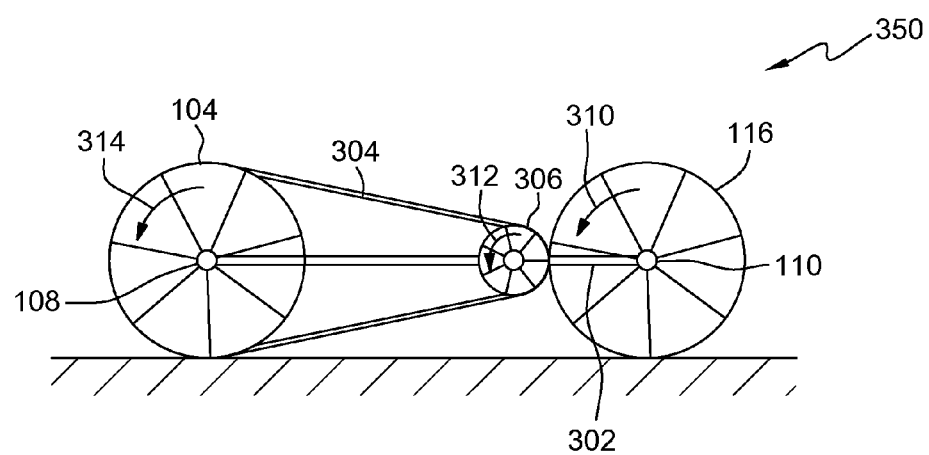

FIG. 3A-B shows side view 300 of an interlock braking apparatus before braking and side view 350 of an interlock braking apparatus during braking, respectively, in accordance with an exemplary embodiment of the present invention. In this exemplary embodiment, connector 302, uncrossed belt mechanism 304, and wheel 306 act in place of a crossed belt mechanism 120 (not shown), wheel 106 (not shown), and wheel 118 (not shown) as a means for slowing rotation of wheel 116.

Side view 300 (FIG. 3A) shows wheel 104, wheel 116, axle 108, axle 110, connector 302, uncrossed belt mechanism 304, wheel 306, and initial gap 308. Before braking, wheel 104, wheel 116, and wheel 306 all rotate in the same direction, designated direction of rotation 310, direction of rotation 312, and direction of rotation 314. Wheel 306 is freely mounted on connector 302. Uncrossed belt mechanism 304 connects wheel 104 and wheel 306. Uncrossed belt mechanism 304 is made of a highly elastic material, such as but not limited to steel, which can withstand the tension, potentially very high in heavy-machinery embodiments, developed in uncrossed belt mechanism 304 during braking. Initial gap 308 is a gap between wheel 116 and wheel 306 that allows wheel 116 and wheel 306 to rotate independently.

Side view 350 (FIG. 3B) shows wheel 104, wheel 116, axle 108, axle 110, connector 302, uncrossed belt mechanism 304, wheel 306, direction of rotation 310, direction of rotation 312, and direction of rotation 314. During braking, wheel 306 travels along connector 302 to approach wheel 116 and close initial gap 308 (not shown). When initial gap 308 is closed, engagement of wheel 306 with wheel 116 slows the initial rotation of wheel 116.

FIG. 3A-B shows the braking contact points between wheel 306 and wheel 116 on an edge face of the circumference of each wheel rather than a side face perpendicular to the axle of each wheel, which were the contact points described in FIG. 1A-B. It should be noted that the braking wheel (i.e., wheel 118, wheel 306) can use opposite rotation for braking when contacting a side face and use the same direction of rotation for braking when contacting an edge face. In both embodiments, the effect of wheel 118, 306 can be transferred to the driven wheel 116 and the driving wheel 104 simultaneously through the power transmission mechanism (e.g., crossed belt mechanism 120, uncrossed belt mechanism 304).

Figure 4:
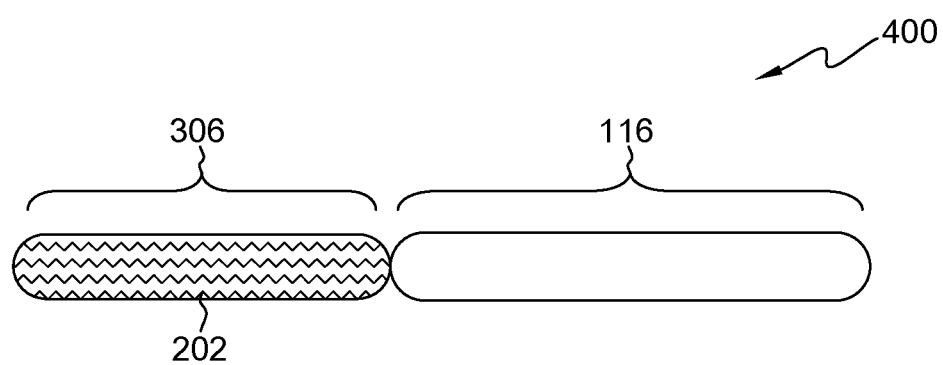
FIG. 4 shows a top view of a braking wheel and a driven wheel, respectively, in accordance with an exemplary embodiment of the present invention.

FIG. 4 shows a top view of a braking wheel and a driven wheel, generally numbered 400, of an interlock braking apparatus during braking, in accordance with an exemplary embodiment of the present invention. Top view 400 shows wheel 306, wheel 116, and brake material 202 around the circumference of wheel 306. Wheel 306 and wheel 116 are shown edge-to-edge during braking. When initial gap 308 (not shown) closes during braking, friction resulting from contact of brake material 202 with the surface of wheel 116 slows the initial rotation of wheel 116, causing braking.

The foregoing description of various embodiments of the present invention has been presented for the purposes of illustration and description. It is not intended to be exhaustive nor limit the invention to the precise form disclosed. Many modifications and variations of the present invention are possible. Such modifications and variations that may be apparent to a person skilled in the art of the invention are intended to be included within the scope of the invention as defined by the accompanying claims.

What is claimed is:

1. A method for interlock braking, the method comprising:
providing a driving wheel of a vehicle configured to engage the ground and a driven wheel of the vehicle configured to engage the ground, wherein the driving wheel and the driven wheel are configured to rotate in a same first direction, the driven wheel comprising a first braking surface;
providing a first braking wheel and a second braking wheel, the second braking wheel comprising a second braking surface, wherein the first braking wheel rotates in the first direction and is driven by a motion of the vehicle and the second braking wheel is driven by a crossed power transmission mechanism connected with the first braking wheel such that the second braking wheel rotates in a second opposite direction, and wherein the driven wheel and the second braking wheel are mounted coaxially and configured to rotate independently and in opposite directions;

closing a gap between the driven wheel and the second braking wheel to bring the first braking surface and the second braking surface into contact with each other while the driven wheel and the second braking wheel are rotating in opposite directions, thereby generating a braking force between the second braking wheel and the driven wheel to slow rotation of the driven wheel and transmitting the braking force via the power transmission mechanism to the driving wheel.

* * * * *